(12) United States Patent
Ono

(10) Patent No.: US 8,249,378 B2
(45) Date of Patent: Aug. 21, 2012

(54) IMAGE RECOGNITION APPARATUS AND IMAGE RECOGNITION METHOD

(75) Inventor: Soichiro Ono, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 367 days.

(21) Appl. No.: 12/624,170

(22) Filed: Nov. 23, 2009

(65) Prior Publication Data

US 2010/0215283 A1   Aug. 26, 2010

(30) Foreign Application Priority Data

Feb. 24, 2009   (JP) ................................ P2009-040770

(51) Int. Cl.
*G06K 9/40* (2006.01)
(52) U.S. Cl. ......... 382/255; 382/266; 382/260; 382/276
(58) Field of Classification Search .................. 382/255, 382/260, 264, 266, 276
See application file for complete search history.

(56) References Cited

U.S. PATENT DOCUMENTS

| | | | |
|---|---|---|---|
| 7,471,830 B2 | 12/2008 | Lim et al. | |
| 7,528,883 B2 * | 5/2009 | Hsu | 348/345 |
| 7,561,186 B2 * | 7/2009 | Poon | 348/208.99 |
| 7,986,843 B2 * | 7/2011 | Chaudhury et al. | 382/229 |
| 8,068,668 B2 * | 11/2011 | Hong | 382/168 |
| 2004/0120598 A1 * | 6/2004 | Feng | 382/263 |
| 2006/0187324 A1 * | 8/2006 | Lin | 348/241 |
| 2008/0013861 A1 * | 1/2008 | Li et al. | 382/286 |

FOREIGN PATENT DOCUMENTS

| | | |
|---|---|---|
| EP | 1 473 658 A2 | 11/2004 |
| JP | 62-72085 | 4/1987 |
| JP | 02-166583 | 6/1990 |
| JP | 2002-369071 | 12/2002 |
| JP | 2004-280832 | 10/2004 |

OTHER PUBLICATIONS

Notice of Reasons for Rejection issued by the Japanese Patent Office on Jan. 25, 2011, for Japanese Patent Application No. 2009-040770, and English-language translation thereof.

* cited by examiner

*Primary Examiner* — Stephen R Koziol
(74) *Attorney, Agent, or Firm* — Finnegan, Henderson, Farabow, Garrett & Dunner, L.L.P.

(57) ABSTRACT

An image recognition apparatus according to one aspect of the present invention has a measurement unit measuring a blur level of an image, a comparison unit comparing the blur level measured in the measurement unit with a threshold, an image processing unit applying to the image a blurring filter which increases the blur level when the blur level measured in the measurement unit is smaller than the threshold, and applying to the image a deblurring filter which decreases the blur level when the blur level measured in the measurement unit is larger than the threshold, and a recognition unit recognizing the image from features of the image processed in the image processing unit.

8 Claims, 7 Drawing Sheets

FIG. 2

| 0 | 1 | 0 |
|---|---|---|
| 1 | -4 | 1 |
| 0 | 1 | 0 |

FIG. 3

| 1 | 1 | 1 |
|---|---|---|
| 1 | -8 | 1 |
| 1 | 1 | 1 |

FIG. 4

| 0 | $\varepsilon$ | 0 |
|---|---|---|
| $\varepsilon$ | 1 | $\varepsilon$ |
| 0 | $\varepsilon$ | 0 |

FIG. 5

| $\varepsilon^2$ | $\varepsilon$ | $\varepsilon^2$ |
|---|---|---|
| $\varepsilon$ | 1 | $\varepsilon$ |
| $\varepsilon^2$ | $\varepsilon$ | $\varepsilon^2$ |

FIG. 6

| 0 | 0 | 0 |
|---|---|---|
| 0 | K | 0 |
| 0 | 0 | 0 |

FIG. 7

| 0 | $K\varepsilon$ | 0 |
|---|---|---|
| $K\varepsilon$ | K | $K\varepsilon$ |
| 0 | $K\varepsilon$ | 0 |

FIG. 8

| $2K\varepsilon$ | $K(1-4\varepsilon)$ | $2K\varepsilon$ |
|---|---|---|
| $K(1-4\varepsilon)$ | $-4K(1-\varepsilon)$ | $K(1-4\varepsilon)$ |
| $2K\varepsilon$ | $K(1-4\varepsilon)$ | $2K\varepsilon$ |

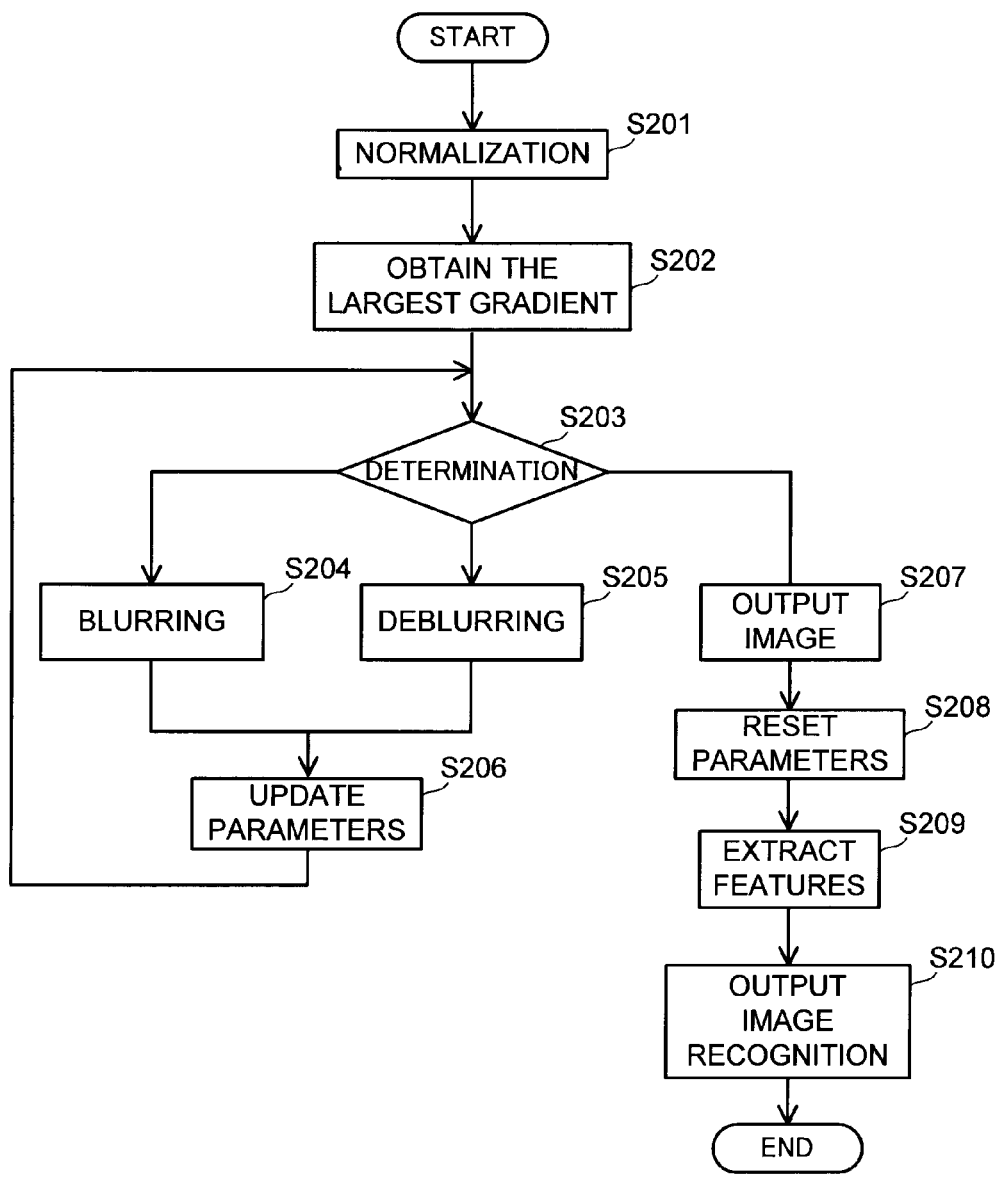

IMAGE RECOGNITION APPARATUS AND IMAGE RECOGNITION METHOD

CROSS-REFERENCE TO RELATED APPLICATIONS

This application is based upon and claims the benefit of priority from the prior Japanese Patent Application No. 2009-040770, filed on Feb. 24, 2009; the entire contents of which are incorporated herein by reference.

BACKGROUND OF THE INVENTION

1. Field of the Invention

The present invention relates to an image recognition apparatus and an image recognition method which recognizes input images by comparing them with image patterns registered in a dictionary in advance.

2. Description of the Related Art

A conventional image recognition apparatus generates a sampling pattern by performing predetermined processes on an input image and normalizing this image, and thereafter compares similarities between the sampling pattern and plural patterns registered in advance in the storage unit so as to recognize the input image. However, the complexity of the calculation of the similarities is enormous and an image recognition process takes a long time in the image recognition apparatus. Accordingly, there are proposed methods to recognize an input image by taking gradations of pixels (pixel values) of an image as features ((JP-A 02-166583 (KOKAI)).

SUMMARY OF THE INVENTION

The conventional image recognition apparatus processes, without considering the quality of images, all the images evenly, and thereafter performs image recognition. Thus, the image recognition depends on the quality of images.

In view of the above, the present invention has an object to provide an image recognition apparatus and an image recognition method which are capable of robustly recognizing images regardless of the quality of input images.

An image recognition apparatus according to one aspect of the present invention has a measurement unit measuring the blur level of an image, a comparison unit comparing the blur level measured in the measurement unit with a threshold, an image processing unit applying to the image a blurring filter which increases the blur level when the blur level measured in the measurement unit is smaller than the threshold, and applying to the image a deblurring filter which decreases the blur level when the blur level measured in the measurement unit is larger than the threshold, and a recognition unit recognizing the image from features of the image processed in the image processing unit.

An image recognition method according to one aspect of the present invention includes measuring a blur level of an image, comparing the blur level with a threshold, applying to the image a blurring filter which increases the blur level when the blur level measured in the measurement is smaller than the threshold, and applying to the image a deblurring filter which decreases the blur level when the blur level measured in the measurement is larger than the threshold, and recognizing the image from features of the image after the filter is applied.

The present invention enables to provide an image recognition apparatus and an image recognition method which are capable of robustly recognizing an image without depending on a difference in image quality.

BRIEF DESCRIPTION OF THE DRAWINGS

FIG. 2 is a diagram showing an example of a gradient filter.
FIG. 3 is a diagram showing an example of a gradient filter.
FIG. 4 is a diagram showing an example of a blurring filter.
FIG. 5 is a diagram showing an example of the blurring filter.
FIG. 6 is a diagram showing a unit impulse.
FIG. 7 is a diagram showing a result of applying the gradient filter to the unit impulse.
FIG. 8 is a diagram showing a result of applying a combined filter to the unit impulse.
FIG. 13 is a flowchart showing an example of operation of the image recognition apparatus according to the second embodiment.

DETAILED DESCRIPTION OF THE INVENTION

Figure 1:
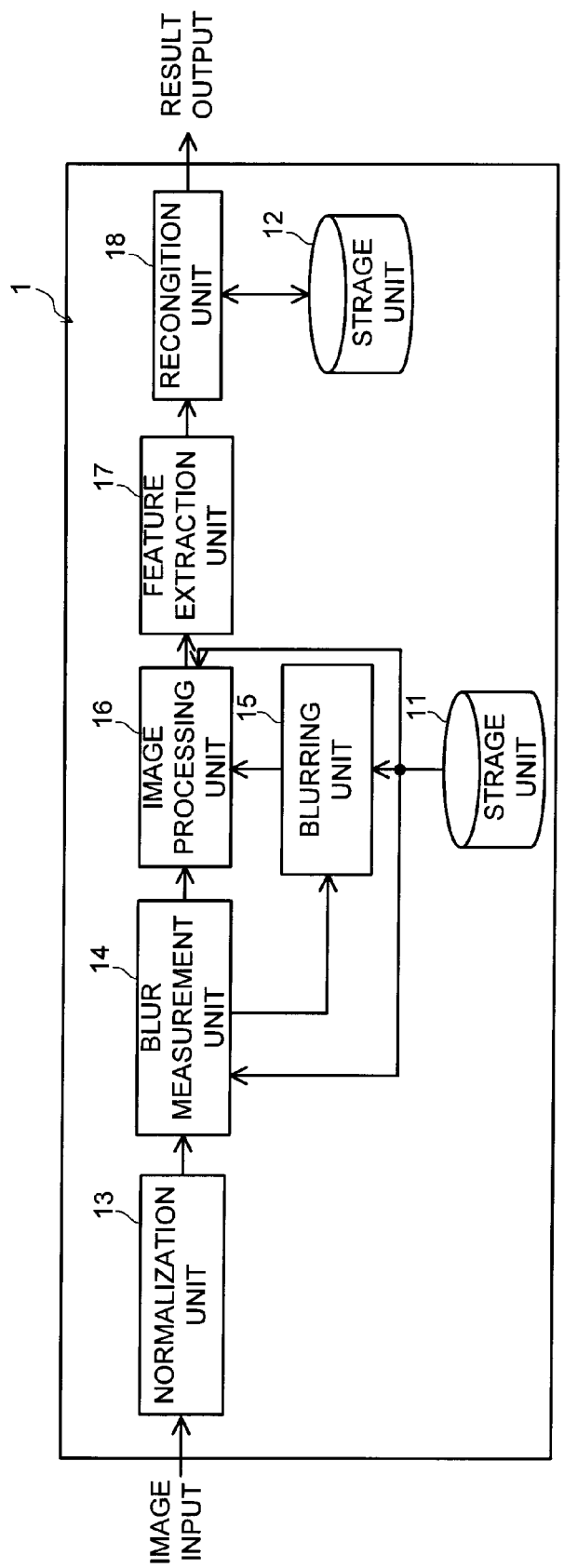
FIG. 1 is a diagram showing an example of a structure of an image recognition apparatus according to a first embodiment.

Hereinafter, embodiments of the present invention will be described in detail with reference to the drawings.
(First Embodiment)

It is known that, in image recognition, a recognition rate of image becomes high rather with moderately blurred images. Accordingly, an image recognition apparatus 1 according to a first embodiment measures the blur level of input images, subjects the image to blurring- or deblurring-processes so that the blur level coincides or approximates the predetermined value, and thereafter recognizes the image. Accordingly, the image recognition apparatus 1 according to the first embodiment is able to robustly recognize images regardless of the quality of the images.

Hereinafter, using FIG. 1 to FIG. 10, a structure of the image recognition apparatus 1 according to the first embodiment will be described. The image recognition apparatus 1 according to the first embodiment has a storage unit 11, a storage unit 12, a normalization unit 13, a blur measurement unit 14, a blurring unit 15, an image processing unit 16, a feature extraction unit 17 and a recognition unit 18.

The storage unit 11 stores a gradient filter L, a blurring filter $G_\epsilon$, a sharpness filter $S_\delta$, a relation between a blur amount $\beta$ as parameters indicating the blur level of an image and its largest absolute gradient value M, a target value $\alpha$, and so on.
(Gradient Filter L)

The gradient filter L is used when measuring the blur amount $\beta$ of a normalized image input from the normalization unit 13 in the blur measurement unit 14. This gradient filter L obtains a two-dimensional gradient of an image, and a Laplacian filter, a Prewitt filter, a Sobel filter, or the like can be used.

FIG. 2 and FIG. 3 are diagrams showing examples of such a gradient filter L. FIG. 2 is a 4-neighbor Laplacian filter.
FIG. 3 is an 8-neighbor Laplacian filter.
(Blurring Filter $G_\epsilon$)

The blurring filter $G_\epsilon$ enlarges (increases) the blur amount $\beta$ of an image normalized in the normalization unit 13. As such a filter, one that satisfies the following relation (1) can be used.

$$G_{\epsilon 2} \cdot G_{\epsilon 1} \cong G_{\epsilon 1+\epsilon 2} \quad (1)$$

Here, $\epsilon$ is a parameter indicating the blur level of an image.

The equation (1) means that it will suffice when sequential application of the blurring filter $G_{\epsilon 1}$ having a parameter $\epsilon 1$ and the blurring filter $G_{\epsilon 2}$ having a parameter $\epsilon 2$ to a normalized image is approximately the same as application of the blurring filter $G_{\epsilon 1+\epsilon 2}$ having the parameters $\epsilon 1+\epsilon 2$ to a normalized image.

As the blurring filter $G_{\epsilon}$ satisfying the above condition, for example, filters shown in FIG. 4 and FIG. 5 can be used. FIG. 4 is a 4-neighbor Gaussian filter. FIG. 5 is an 8-neighbor Gaussian filter. The parameter $\epsilon$ satisfies the following condition (2).

$$0 < \epsilon < 1 \quad (2)$$

(Deblurring Filter $S_\delta$)

The deblurring filter $S_\delta$ decreases (reduces) the blur amount $\beta$ of an image normalized in the normalization unit 13. As such a filter, one satisfying the following relation (3) can be used.

$$S_\delta \cdot G_\epsilon \cong S_{\delta-\epsilon} \quad (3) \text{ (where } \delta < \epsilon)$$

Here, $\delta$ is a parameter showing the degree of sharpness of an image.

The relation (3) means that it will suffice when sequential application of the blurring filter $G_\epsilon$ having the parameter $\epsilon$ and the deblurring filter $S_\delta$ having a parameter $\delta$ to a normalized image is approximately equivalent to an application of a blurring filter $G_{\epsilon-\delta}$ having a parameter $\epsilon-\delta$ to the normalized image.

As an example of the deblurring filter $S_\delta$, one using the 4-neighbor Laplacian filter shown in FIG. 2 is shown by the following equation (4).

$$S_\delta = I - \delta \cdot L_4 / (1 - 4\delta) \quad (4)$$

Here, I represents identical transformation and $L_4$ represents the 4-neighbor Laplacian filter.

(Relation for the Blur Amount $\beta$ and the Largest Absolute Gradient M)

In this first embodiment, a blurring process of the unit impulse d shown in FIG. 6 is simulated in advance so as to calculate the blur amount $\beta$ and then the relationship between $\beta$ and M is derived, where $\beta$ is the blur amount of a normalized image and M is the largest absolute pixel value of the image which is obtained by applying the gradient filter L to the normalized image.

A value K in FIG. 6 is the largest value in an ideal image having no blur. The value of this K can be determined by experiment. Value M is the largest value of the absolute values of pixels obtained when the gradient filter L is applied to an image normalized in the normalization unit 13.

The relation between the blur amount $\beta$ and the largest absolute gradient M is derived as follows.

1. A combined filter $L \cdot G_\epsilon$ combining the above-described gradient filter L and the blurring filter $G_\epsilon$ is applied to the unit impulse d.
2. The largest pixel value of the image on which the combined filter $L \cdot G_\epsilon$ was applied is taken as the value of a function P of $\epsilon$ as the following equation (5).

$$P(\epsilon) = M \quad (5)$$

The value $\epsilon_0$ which satisfies the equation (5) is taken as the blur amount $\beta$, and thereby the relation between the largest absolute gradient M and the blur amount $\beta$ is obtained. If it is difficult to solve the equation (5) analytically, an approximate solution may be used instead.

An example in which the 4-neighbor Laplacian filter shown in FIG. 2 as the gradient filter L and the 4-neighbor Gaussian filter shown in FIG. 4 as the blurring filter $G_\epsilon$ are used is shown below. In this example, when the blurring filter $G_\epsilon$ is applied to the unit impulse d shown in FIG. 6, a result shown in FIG. 7 is obtained. When the combined filter $L \cdot G_\epsilon$ is applied to the unit impulse d shown in FIG. 6, a result shown in FIG. 8 is obtained.

When the results shown in FIG. 7 and FIG. 8 are applied to the equation (5), the following equation (6) is obtained.

$$\beta = 1 - M/4K \quad (6)$$

Thus, the relation between the blur amount $\beta$ and the largest absolute gradient M is derived.

(Target Value $\alpha$)

The target value $\alpha$ is defined as the blur amount with which images are supposed to be suitable for recognition. By processing an image so that the blur amount $\beta$ of the image measured by the blur measurement unit 14 matches or approximates to this target value $\alpha$, the image can be recognized robustly regardless of the quality.

In this first embodiment, the target value a is determined by the following procedure:

1. Various images which supposedly belong to the same statistical population as or are similar to input images to this image recognition apparatus 1 are normalized to generate normalized images.
2. The blur amount $\beta$ of each normalized image is calculated according to the equation (6), using the gradient filter L.
3. The average $\alpha_p$ of the calculated blur amounts $\beta$'s is calculated.
4. Value $\alpha$ given by the following equation (7) is taken as the target value, where $\alpha_f$ is the parameter of the blurring filter G which is used in the feature extraction unit of one of such conventional image recognition apparatuses as the ones defined in JP-A02-166583 (KOKAI).

$$\alpha = \alpha_p + \alpha_f \quad (7)$$

The storage unit 12 is a dictionary memory in which image patterns necessary for recognition of an input image are registered.

Figure 9:
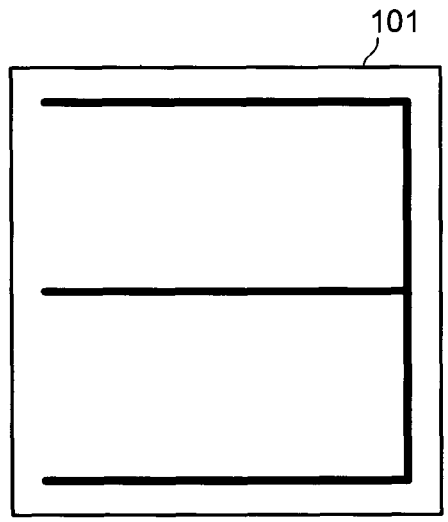
FIG. 9 is a diagram showing an example of an input image.

The normalization unit 13 normalizes an input image to generate a normalized image. FIG. 9 shows an example of an image 101 input to the normalization unit 13. When the image 101 shown in FIG. 9 is input from the outside, the normalization unit 13 cuts out a recognition target part from the input image 101.

Figure 10:
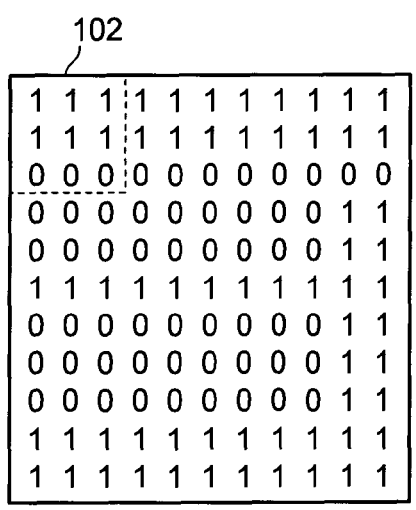
FIG. 10 is a diagram showing an example of an image after being normalized.

Next, the normalization unit 13 enlarges or reduces the height and/or the width of the binarized image to normalize the size and position of the letter in the input image. FIG. 10 shows an image normalized by the normalization unit 13. In this first embodiment, an input image is normalized to an image with a pixel arrangement of 11 lines and 11 rows. In FIG. 10, the value of a white pixel is represented by "0", and the value of a black pixel is represented by "1"). The pixel arrangement is not limited to 11 lines and 11 columns, and various arrangements can be adopted.

The blur measurement unit 14 measures the blur amount $\beta$ of the normalized image input from the normalization unit 13. The blur measurement unit 14 reads the gradient filter L stored in the storage unit 11 and applies the filter on the image input from the normalization unit 13. The blur measurement unit 14 calculates pixel values of the image according to the weight defined in the gradient filter L.

For example, the pixel value after the 4-neighbor Laplacian filter shown in FIG. 2 was applied on an upper-left part 102 of the image shown in FIG. 10 is 1. The blur measurement unit 14 calculates pixel values while shifting rightward by one pixel from the upper-left part 102 of the image shown in FIG. 10.

When pixel values are calculated as far as the right end of the image, the blur measurement unit 14 shifts downward by one pixel, and calculates pixel values by the similar calculation as above. The blur measurement unit 14 calculates pixel values similarly for remaining parts. In this example, the blur measurement unit 14 calculates pixel values of nine lines and nine columns, 81 pixel values in total (since the pixel arrangement of the image has 11 lines and 11 columns). The blur measurement unit 14 obtains the largest absolute gradient M of the 81 pixel values calculated.

The blur measurement unit 14 substitutes the obtained largest value M into the equation (5) stored in the storage unit 11, so as to calculate the blur amount $\beta$. To avoid influence of noise, a certain number of the highest values among the calculated pixel values may be excluded and the largest value may be obtained from the remaining values. It is not always necessary to calculate 81 pixel values in total of nine lines and nine columns. For example, pixel values may be calculated while shifting by two pixels. Alternatively, assuming that pixels of pixel value 0 (zero) exist outside the image, pixel values of 11 lines and 11 columns, 121 in total may be calculated.

A memory may be provided in the blur measurement unit 14, and the gradient filter L and the equation (5) may be stored in the memory. When the blur amount $\beta$ measured in the blur measurement unit 14 is out of a predetermined range, this image may be discarded and the process may be stopped.

The blurring unit 15 compares the blur amount $\beta$ input from the blur measurement unit 14 with the target value $\alpha$ stored in the storage unit 11. When the blur amount $\beta$ is smaller than the target value $\alpha$, the blurring unit 15 instructs the image processing unit 16 to perform blurring on the image input from the normalization unit 13. When the blur amount $\beta$ is larger than the target value $\alpha$, the blurring unit 15 instructs the image processing unit 16 to perform deblurring on the image input from the normalization unit 13. When the blur amount $\beta$ is equal to the target value $\alpha$, the blurring unit 15 instructs the image processing unit 16 to input the image input from the normalization unit 13 as it is to the feature extraction unit 17. A memory may be provided in the blur amount comparison unit, and the target value $\alpha$ may be stored in this memory in advance.

The image processing unit 16 performs blurring- or deblurring-processes of the image input from the normalization unit 13 based on the instruction from the blurring unit 15. When performing blurring on an image, the image processing unit 16 reads the blurring filter $G_\epsilon$ stored in the storage unit 11 and applies this filter to the image. The parameter $\epsilon$ of the blurring filter $G_\epsilon$ at this time is set to $\alpha-\beta$.

When performing deblurring onon an image, the image processing unit 16 reads the deblurring filter $S_\delta$ stored in the storage unit 11 and applies this filter to the image. The parameter $\delta$ of the deblurring filter $S_\delta$ at this time is set to $\beta-\alpha$.

The feature extraction unit 17 extracts features of an image after being image processed which is input from the image processing unit 16. At this time, pixel values forming an image input from the image processing unit 16 may be assumed as the components of a vector and thus extracted as features.

The recognition unit 18 retrieves from image patterns registered in the storage unit 12 an image pattern having closest features to the features input from the feature extraction unit 17. Next, the recognition unit 18 outputs the retrieved image pattern as the recognition result. For the image recognition in the recognition unit 18, the CLAFIC (CLAss-Featuring Information Compression) method or the like can be used.

Next, operation of the image recognition apparatus 1 according to the first embodiment will be described.

Figure 11:
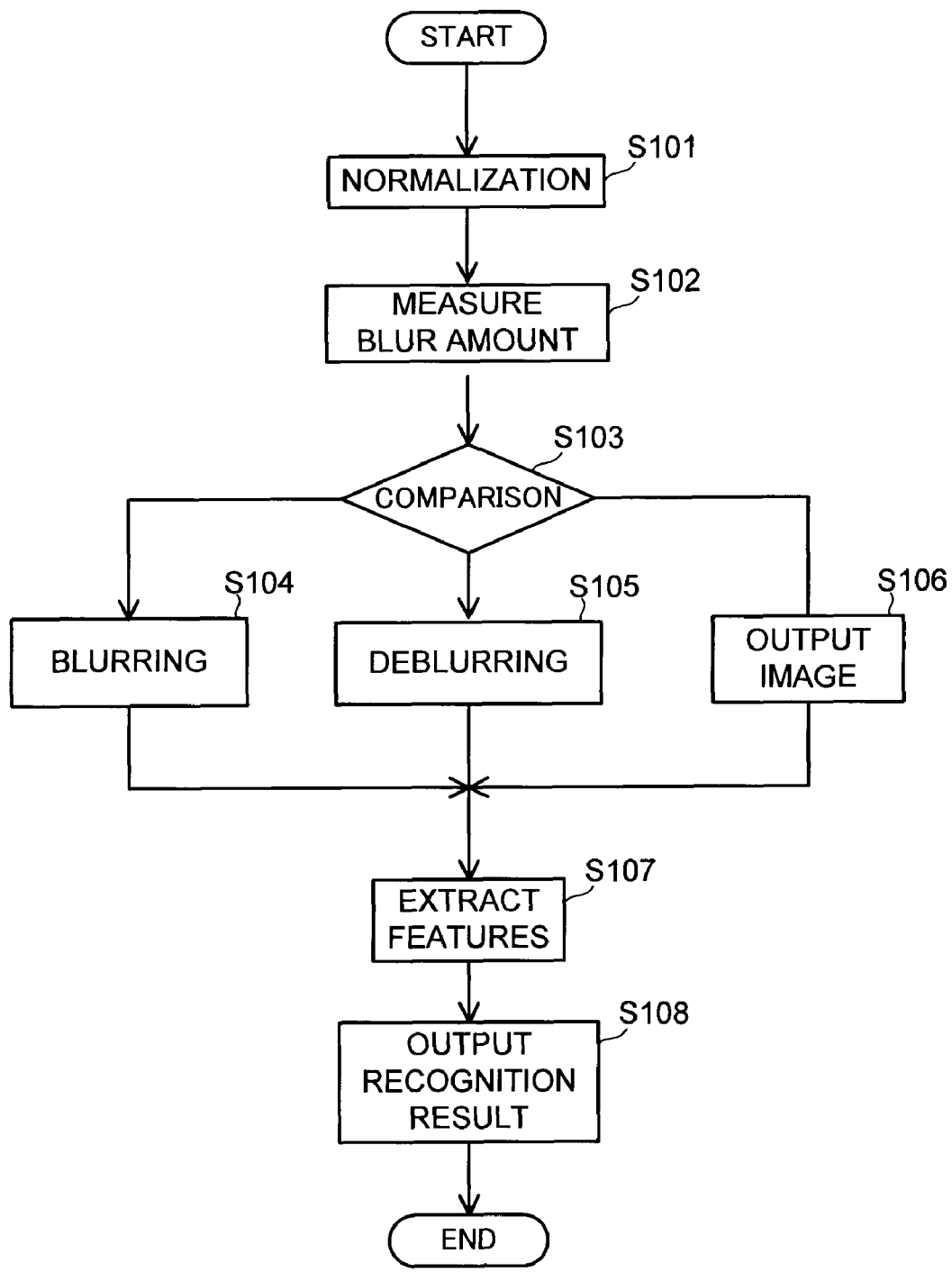
FIG. 11 is a flowchart showing an example of operation of the image recognition apparatus according to the first embodiment.

FIG. 11 is a flowchart showing an example of the operation of the image recognition apparatus 1.

The normalization unit 13 normalizes input images (step S101).

The blur measurement unit 14 calculates the blur amount $\beta$ of an image input from the normalization unit 13 (step S102). The blurring unit 15 compares the blur amount $\beta$ input from the blur measurement unit 14 with the target value $\alpha$ of blur amount (step S103).

When the blur amount $\beta$ calculated in the blur measurement unit 14 is smaller than the target value $\alpha$, the blurring unit 15 instructs the image processing unit 16 to perform blurring on the image input from the normalization unit 13. When the blur amount $\beta$ calculated in the blur measurement unit 14 is larger than the target value $\alpha$, the blurring unit 15 instructs the image processing unit 16 to perform deblurring on the image input from the normalization unit 13. When the blur amount $\beta$ calculated in the blur measurement unit 14 is equal to the target value $\alpha$, the blurring unit 15 instructs the image processing unit 16 to input the image input from the normalization unit 13 as it is to the feature extraction unit 17.

When instructed by the blurring unit 15 to perform blur-conversion, the image processing unit 16 performs blurring on the image input from the normalization unit 13 (step S104). When instructed by the blurring unit 15 to perform sharpness-conversion, the image processing unit 16 performs deblurring on the image input from the normalization unit 13 (step S105). When instructed by the blurring unit 15 to input the image as it is to the feature extraction unit 17, the image processing unit 16 inputs the image input by the normalization unit 13 as it is to the feature extraction unit 17 (step S106).

The feature extraction unit 17 extracts features of the image which was input from the image processing unit 16 (step S107). The recognition unit 18 retrieves from the storage unit 12 an image pattern having closest features to the features input from the feature extraction unit 17. The recognition unit 18 outputs the retrieved image pattern as a recognition result (step S108).

As above, the image recognition apparatus 1 according to this first embodiment measures the blur amount $\beta$ of an input image. When the blur amount $\beta$ of the input image is different from the target value $\alpha$, the apparatus performs blurring- or deblurring-processes on the input image, and thereafter recognizes the image.

Accordingly, a result of image recognition does not depend on the quality of the input image. Consequently, stable image recognition is possible. Further, the relation between the blur amount $\beta$ and M is obtained in advance, and blurring- or deblurring-processes is performed on the image based on the relation. Thus, by one time of blurring- or deblurring-processes, an image can be converted into an image having an appropriate blur amount for image recognition.

(Second Embodiment)

In the first embodiment, an embodiment, in which the relation between the blur amount $\beta$ and the largest absolute gradient M was obtained in advance, and the image is subjected to blurring- or deblurring-processes with the relation, was described. In the second embodiment, an embodiment will be described in which an image is subjected to blurringor deblurring-processes until the largest absolute gradient M comes within a range calculated in advance by measurement.

Figure 12:
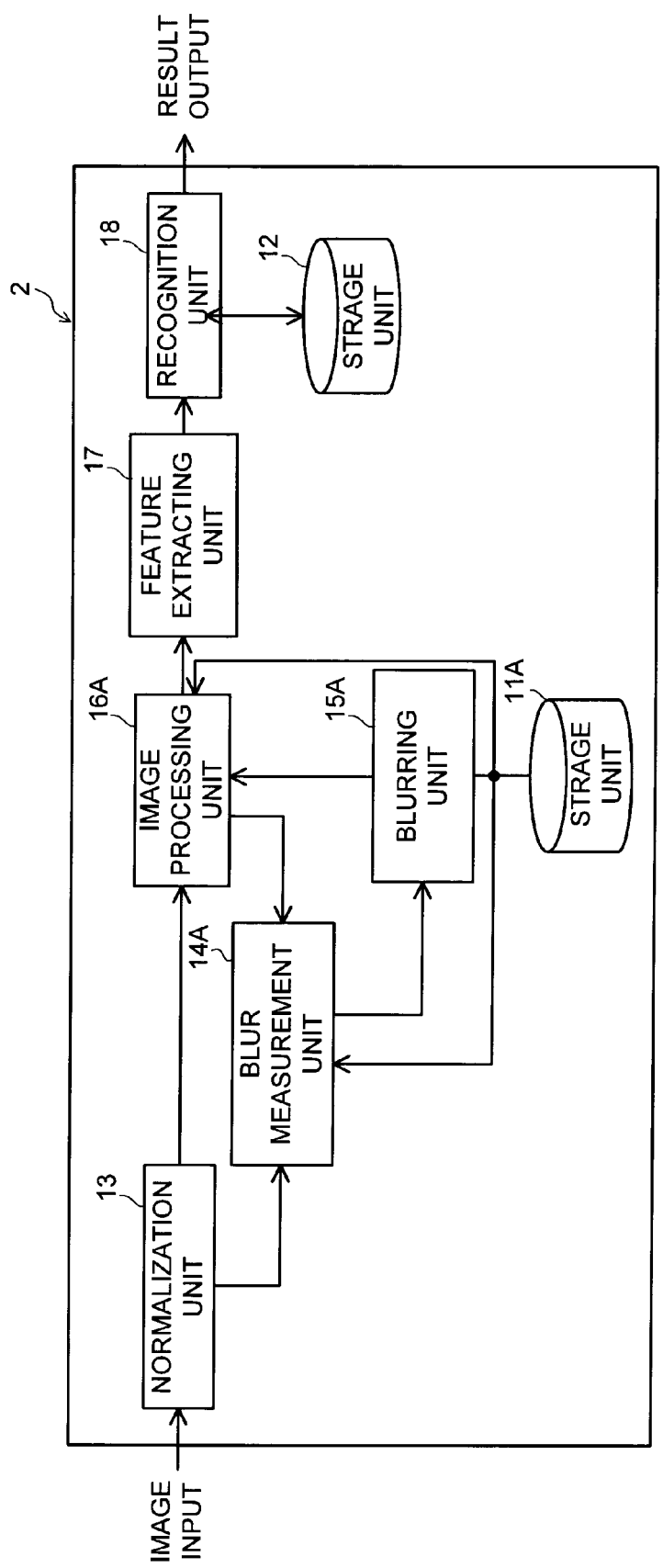
FIG. 12 is a diagram showing an example of a structure of an image recognition apparatus according to a second embodiment.

FIG. 12 is a diagram showing an example of a structure of an image recognition apparatus 2 according to a second embodiment. Hereinafter, the image recognition apparatus 2 according to the second embodiment will be described using FIG. 12. The same components as those described with FIG. 1 are designated by the same reference numerals, and overlapping descriptions are omitted. In this second embodiment, the largest absolute gradient M is a parameter representing a blur level.

The image recognition apparatus 2 according to the second embodiment has a storage unit 11A, a storage unit 12, a normalization unit 13, a blur measurement unit 14A, a blurring unit 15A, an image processing unit 16A, a feature extraction unit 17, and a recognition unit 18.

The storage unit 11A stores a gradient filter L, a blurring filter $G_\epsilon$, a sharpness filter $S_\delta$, a threshold $T_{max}$, a threshold $T_{min}$, and so on. These items will be described below, but since the gradient filter L, the blurring filter $G_\epsilon$, and the sharpness filter $S_\delta$ are described in the first embodiment, overlapping descriptions thereof are omitted.

(Thresholds $T_{max}$, $T_{min}$)

In the second embodiment, the range of the largest absolute gradient M is predetermined as the one which are suitable for recognition, and this range is denoted as the range from the threshold $T_{min}$ to the threshold $T_{max}$. That is, the image recognition apparatus 2 recognizes an image when the largest absolute gradient M of an image measured by the blur measurement unit 14A is in the range from the threshold $T_{max}$ to the threshold $T_{max}$.

In the second embodiment, the thresholds $T_{max}$, $T_{min}$ are determined by the following procedure:

1. Various images which supposedly belong to the same statistical population as or are similar to input images to this image recognition apparatus 2 are normalized to generate normalized images.
2. The largest absolute gradient M of each normalized image is calculated using the gradient filter L.
3. An average value $M_0$ and a standard deviation $\sigma$ of the calculated largest values M's are calculated.
4. The range given by the following condition (8) is determined as the range of the largest absolute gradient M.

$$M_0 - c\sigma \leq M_0 \leq M_0 + c\sigma \quad (8)$$

where c denotes a positive constant number. The term $M_0 + c\sigma$ denotes the threshold $T_{max}$ and the term $M_0 - c\sigma$, denotes the threshold $T_{min}$.

The blur measurement unit 14A reads the gradient filter L stored in the storage unit 11A, and applies the filter on the image input from the normalization unit 13 or the image processing unit 16A. Then the blur measurement unit calculates pixel values of the image according to the weight defined in the gradient filter L. The method of calculation is the same as that described in the first embodiment. The blur measurement unit 14A obtains the largest absolute gradient M from the absolute values of all the calculated pixel values.

Similarly to the first embodiment, to avoid the influence of noise, a certain number of higher values among the calculated pixel values may be excluded from objects of obtaining the largest values, and the largest value may be obtained from the remaining values. When the largest absolute gradient M measured in the blur measurement unit 14A is out of the predetermined range, this image may be discarded and the process may be stopped.

The blurring unit 15A determines whether or not the largest absolute gradient M obtained by the blur measurement unit 14A is in the range from the threshold $T_{min}$ to the threshold $T_{max}$ stored in the storage unit 11A. When the largest absolute gradient M is smaller than the threshold $T_{min}$, the blurring unit 15A instructs the image processing unit 16A to perform blurring on the image input from the normalization unit 13.

When the largest absolute gradient M is larger than the threshold $T_{max}$, the blurring unit 15A instructs the image processing unit 16A to perform the deblurring on the image input from the normalization unit 13. When the largest absolute gradient M is in the range from the threshold Tmin to the threshold Tmax, the blurring unit 15A instructs the image processing unit 16A to input the image input from the normalization unit 13 as it is to the feature extraction unit 17. A memory may be provided in the blurring unit 15A, and the threshold $T_{max}$ and the threshold $T_{min}$ may be stored in this memory in advance.

The image processing unit 16A performs blurring- or deblurring-processes of the image input from the normalization unit 13 based on the instruction from the blurring unit 15A. When performing blurring on an image, the image processing unit 16A reads the blurring filter $G_\epsilon$ stored in the storage unit 11A and applies this filter to the image. When performing the deblurring on an image, the image processing unit 16A reads the deblurring filter $S_\delta$ stored in the storage unit 11A and applies this filter to the image. Sufficiently small values are set to the parameters $\epsilon$, $\delta$.

The image subjected to blurring- or deblurring-processes by the image processing unit 16A is subjected to blurring- or deblurring-processes repeatedly until the measured largest value M comes within the range from the threshold Tmin to the threshold Tmax. The parameter $\epsilon$ of the blurring filter $G_\epsilon$ and the parameter $\delta$ of the deblurring filter $S_\delta$ are set to a smaller value every time the same image is subjected to blurring- or deblurring-processes.

Thus, by decreasing the amount of change of the blur level by the blurring filter $G_\epsilon$ or the deblurring filter $S_\delta$ gradually, the measured largest value M is prevented from getting out of the range from the threshold $T_{min}$ to the threshold $T_{max}$.

Further, the number of times of performing blurring- or deblurring-processes on the same image may be stored in the image processing unit 16A, and the image may be discarded or the processing may be stopped when the number of times surpasses a certain value.

Next, operation of the image recognition apparatus 2 according to the second embodiment will be described. FIG. 13 is the flowchart showing an example of the operation of the image recognition apparatus 2.

The normalization unit 13 normalizes an input image (step S201).

The blur measurement unit 14A calculates pixel values of the image input from the normalization unit 13 after applying the gradient filter L on it. Next, the blur measurement unit 14A obtains the largest absolute gradient M from all the calculated pixel values (step S202).

The blurring unit 15A determines whether or not the largest absolute gradient M obtained by the blur measurement unit 14A is in the range from the threshold $T_{min}$ to the threshold $T_{max}$ stored in the storage unit 11A (step S203). When the largest absolute gradient M is smaller than the threshold $T_{min}$, the blurring unit 15A instructs the image processing unit 16A to perform blurring on the image input from the normalization unit 13.

When the largest absolute gradient M is larger than the threshold $T_{max}$, the blurring unit 15A instructs the image processing unit 16A to perform deblurring on the image input from the normalization unit 13. When the largest absolute gradient M obtained by the blur measurement unit 14A is in the range from the threshold $T_{min}$ to the threshold $T_{max}$ stored in the storage unit 11A, the blurring unit 15A instructs to input the image to the feature extraction unit 17.

When instructed by the blurring unit 15A to perform blur-conversion, the image processing unit 16A performs blurring on the image input from the normalization unit 13 (step S204). When instructed by the blurring unit 15A to perform the sharpness-conversion, the image processing unit 16A performs the deblurring on the image input from the normalization unit 13 (step S205).

After performing blurring- or deblurring-processes on the image, the image processing unit 16A updates values of the parameters $\epsilon$, $\delta$ of the blurring filter $G_\epsilon$ and the deblurring filter $S_\delta$ (step S206). In this update, the image processing unit 16A sets the parameters $\epsilon$, $\delta$ to a smaller value.

When instructed by the blurring unit 15A to input the image to the feature extraction unit 17, the image processing unit 16A inputs the image to the feature extraction unit 17 (step S207). Once the image is input to the feature extraction unit 17, the image processing unit 16A resets the set values of the parameters $\epsilon$, $\delta$ (step S208).

The feature extraction unit 17 extracts features of the image input from the image processing unit 16A (step S209). The recognition unit 18 retrieves from the storage unit 12 an image pattern having closest features to the features input from the feature extraction unit 17. Next, the recognition unit 18 outputs the retrieved image pattern as a recognition result (step S210).

Until the measured largest value M comes within the range from the threshold $T_{min}$ to the threshold $T_{max}$, the process of from the step S203 to the step S206 is repeated on the image subjected to blurring- or deblurring-processes by the image processing unit 16A.

As above, the image recognition apparatus 2 according to the second embodiment determines whether the largest absolute gradient M is in the predetermined range or not. The image recognition apparatus performs blurring- or deblurring-processes of the image until the largest absolute gradient M comes within the predetermined range, and thereafter recognizes the image. Accordingly, its image recognition results do not depend on the quality of the input image, and consequently, it can perform robust image recognition.

(Other Embodiments)

The present invention is not limited to the above embodiments precisely as they are described, and can be embodied with components which are modified in the range not departing from the spirit of the invention in the implementation stage. Various inventions can be formed by appropriately combining plural components disclosed in the above embodiments. For example, some components may be deleted from all the components shown in the embodiments. Furthermore, components ranging across different embodiments may be combined appropriately.

What is claimed is:

1. An image recognition apparatus, comprising:
    a storage unit storing a threshold calculated based on a blur level of a normalized image, the normalized image being obtained by normalizing an image in a predetermined size;
    a measurement unit measuring a blur level of an image;
    a comparison unit comparing the blur level measured in the measurement unit with the threshold;
    an image processing unit applying to the image a blurring filter which increases the blur level when the blur level measured in the measurement unit is smaller than the threshold, and applying to the image a deblurring filter which decreases the blur level when the blur level measured in the measurement unit is larger than the threshold; and
    a recognition unit recognizing the image from features of the image processed in the image processing unit.

2. The apparatus according to claim 1,
    wherein the threshold includes a first value and a second value different from each other; and
    wherein the image processing unit applies the blurring filter or the deblurring filter to the image depending on a comparison result in the comparison unit until the blur level measured in the measurement unit becomes larger than the first value and smaller than the second value.

3. The apparatus according to claim 2, wherein the image processing unit decreases an amount of change of the blur level by the blurring filter or the deblurring filter in stages.

4. The apparatus according to claim 1, wherein the image processing unit uses a Gaussian filter as the blurring filter, and uses a Laplacian filter as a part of the deblurring filter.

5. An image recognition method, comprising:
    normalizing an image in a predetermined size;
    measuring a blur level of the normalized image;
    calculating a threshold based on the blur level;
    measuring a blur level of an input image;
    comparing the blur level with the threshold;
    applying to the input image a blurring filter which increases the blur level when the blur level measured in the measurement is smaller than the threshold, and applying to the input image a deblurring filter which decreases the blur level when the blur level measured in the measurement is larger than the threshold; and
    recognizing the input image from features of the input image after the filter is applied.

6. The method according to claim 5,
    wherein the threshold includes a first value and a second value different from each other; and
    wherein in the application, the blurring filter or the deblurring filter is applied to the input image depending on a comparison result in the comparison until the blur level measured in the measurement becomes equal to or larger than the first value and equal to or smaller than the second value.

7. The method according to claim 5, wherein in the application, an amount of change of the blur level by the blurring filter or the deblurring filter is decreased in stages.

8. The method according to claim 5, wherein in the application, a Gaussian filter is used as the blurring filter, and a Laplacian filter is used as the deblurring filter.

* * * * *